United States Patent
Seo et al.

(10) Patent No.: US 10,638,456 B2
(45) Date of Patent: Apr. 28, 2020

(54) RESOURCE ALLOCATION METHOD FOR DEVICE-TO-DEVICE COMMUNICATION IN WIRELESS COMMUNICATION SYSTEM, AND APPARATUS THEREFOR

(71) Applicant: LG ELECTRONICS INC., Seoul (KR)

(72) Inventors: Hanbyul Seo, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 15/744,309

(22) PCT Filed: Jul. 20, 2016

(86) PCT No.: PCT/KR2016/007900
§ 371 (c)(1),
(2) Date: Jan. 12, 2018

(87) PCT Pub. No.: WO2017/014555
PCT Pub. Date: Jan. 26, 2017

(65) Prior Publication Data
US 2018/0206211 A1 Jul. 19, 2018

Related U.S. Application Data

(60) Provisional application No. 62/194,792, filed on Jul. 20, 2015.

(51) Int. Cl.
*H04W 72/02* (2009.01)
*H04W 4/70* (2018.01)
(Continued)

(52) U.S. Cl.
CPC ............ *H04W 72/02* (2013.01); *H04W 4/70* (2018.02); *H04W 72/0493* (2013.01); *H04W 72/082* (2013.01)

(58) Field of Classification Search
CPC ................................................. H04J 2203/0067
See application file for complete search history.

(56) References Cited

U.S. PATENT DOCUMENTS

2012/0051315 A1  3/2012  Wang et al.
2013/0294296 A1  11/2013  Dimou et al.
(Continued)

FOREIGN PATENT DOCUMENTS

WO   WO 2007/055619 A1   5/2007
WO   WO 2015/053514 A1   4/2015

*Primary Examiner* — Jamaal Henson
(74) *Attorney, Agent, or Firm* — Fish & Richardson P.C.

(57) ABSTRACT

Disclosed in the present application is a method by which a transmission terminal transmits a signal by using device-to-device communication in a wireless communication system. Particularly, the method comprises the steps of: dividing each of a plurality of resource units into clean units and dirty units; selecting at least one of the clean units as a transmission resource when the number of clean units is greater than or equal to a first threshold value; selecting at least one of the dirty units as the transmission resource when the number of clean units is less than the first threshold value; and transmitting a device-to-device communication signal by using the selected transmission resource, wherein the transmission resource selected among the dirty units is determined on the basis of the transmission power of the device-to-device communication signal.

10 Claims, 13 Drawing Sheets

(51) Int. Cl.
*H04W 72/04* (2009.01)
*H04W 72/08* (2009.01)

(56) References Cited

U.S. PATENT DOCUMENTS

| | | | |
|---|---|---|---|
| 2014/0141789 A1* | 5/2014 | Tarokh | H04W 72/02 |
| | | | 455/450 |
| 2014/0274183 A1 | 9/2014 | Zhu et al. | |
| 2015/0045018 A1 | 2/2015 | Liu et al. | |
| 2015/0173060 A1* | 6/2015 | Ge | H04W 4/70 |
| | | | 370/252 |
| 2015/0215903 A1* | 7/2015 | Zhao | H04W 72/082 |
| | | | 370/329 |
| 2016/0183276 A1* | 6/2016 | Marinier | H04W 72/02 |
| | | | 370/329 |
| 2016/0295624 A1* | 10/2016 | Novlan | H04W 72/04 |

* cited by examiner

E-UMTS (A) CONTROL-PLANE PROTOCOL STACK (B) USER-PLANE PROTOCOL STACK (a)

(b)

RESOURCE ALLOCATION METHOD FOR DEVICE-TO-DEVICE COMMUNICATION IN WIRELESS COMMUNICATION SYSTEM, AND APPARATUS THEREFOR

CROSS-REFERENCE TO RELATED APPLICATIONS

This application is the National Phase of PCT International Application No. pct, filed on Jul. 20, 2016, which claims priority under 35 U.S.C. 119(e) to U.S. Provisional Application No. 792, filed on Jul. 20, 2015, all of which are hereby expressly incorporated by reference into the present application.

TECHNICAL FIELD

The present invention relates to a wireless communication system, and more particularly, to a method of allocating a resource for device-to-device communication in a wireless communication system and an apparatus therefor.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE OF THE INVENTION

Technical Task

Based on the aforementioned discussion, a method of allocating a resource for device-to-device communication in a wireless communication system and an apparatus therefor are proposed in the following.

Technical Solution

To achieve these and other advantages and in accordance with the purpose of the present invention, as embodied and broadly described, according to one embodiment, a method of transmitting a signal, which is transmitted by a user equipment using device-to-device (D2D) communication in a wireless communication system, includes the steps of dividing each of a plurality of resource units into clean units and dirty units, if the number of the clean units is equal to or greater than a first threshold, selecting at least one of the clean units as a transmission resource, if the number of the clean units is less than the first threshold, selecting at least one of the dirty units as the transmission resource, and transmitting a D2D communication signal using the selected transmission resource. In this case, the transmission resource selected from among the dirty units is determined based on transmit power of the D2D communication signal.

Preferably, the dividing step can include the step of dividing each of a plurality of the resource units into the clean units and the dirty units according to an interference level for transmitting the signal. In this case, the transmission resource selected from among the dirty units is determined in further consideration of an interference level of the dirty units.

More preferably, the step of selecting at least one of the dirty units as the transmission resource can include the step of selecting one from among dirty units of which the interference level is equal to or less than a second threshold among the dirty units. In this case, the second threshold can be determined based on the transmit power of the D2D communication signal.

And, the step of selecting one from among dirty units of which the interference level is equal to or less than a second threshold among the dirty units include the steps of detecting the number of the dirty units of which the interference level is equal to or less than the second threshold, and if the number of the dirty units of which the interference level is equal to or less than the second threshold is equal to or greater than a third threshold, selecting at least one from among the detected dirty units as the transmission resource.

Or, the dividing step includes the step of dividing each of a plurality of the resource units into the clean units and the dirty units according to a channel gain for transmitting the signal. In this case, the transmission resource selected from among the dirty units can be determined in further consideration of a channel gain of the dirty units.

To further achieve these and other advantages and in accordance with the purpose of the present invention, according to a different embodiment, a user equipment performing device-to-device (D2D) communication in a wireless communication system includes a wireless communication module configured to transceive a signal with a base station or a partner terminal of the D2D communication, and a processor configured to process the signal, the processor configured to divide each of a plurality of resource units into clean units and dirty units, the processor, if the number of the clean units is equal to or greater than a first threshold, configured to select at least one of the clean units as a transmission resource, the processor, if the number of the clean units is less than the first threshold, configured to select at least one of the dirty units as the transmission resource, the processor configured to control the wireless communication module to transmit a D2D communication signal using the selected transmission resource. In this case, the transmission resource selected from among the dirty units can be determined based on transmit power of the D2D communication signal.

Preferably, the processor can divide each of a plurality of the resource units into the clean units and the dirty units according to an interference level for transmitting the signal. In this case, the transmission resource selected from among the dirty units can be determined in further consideration of an interference level of the dirty units.

More preferably, if at least one of the dirty units is selected as the transmission resource, the processor can select one from among dirty units of which the interference level is equal to or less than a second threshold among the dirty units. In this case, the second threshold can be determined based on the transmit power of the D2D communication signal.

More preferably, if one of the dirty units of which the interference level is equal to or less than the second threshold is selected as the transmission resource among the dirty units, the processor is configured to detect the number of the dirty units of which the interference level is equal to or less than the second threshold and if the number of the dirty units of which the interference level is equal to or less than the second threshold is equal to or greater than a third threshold, the processor selects at least one from among the detected dirty units as the transmission resource.

Or, the processor divides each of a plurality of the resource units into the clean units and the dirty units according to a channel gain for transmitting the signal and the transmission resource selected from among the dirty units can be determined in further consideration of a channel gain of the dirty units.

Advantageous Effects

According to embodiments of the present invention, it is able to efficiently allocate a resource for device-to-device communication and it is able to efficiently transmit and receive a signal.

According to embodiments of the present invention, it is able to efficiently determine transmit power for device-to-device communication and it is able to efficiently transmit and receive a signal.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
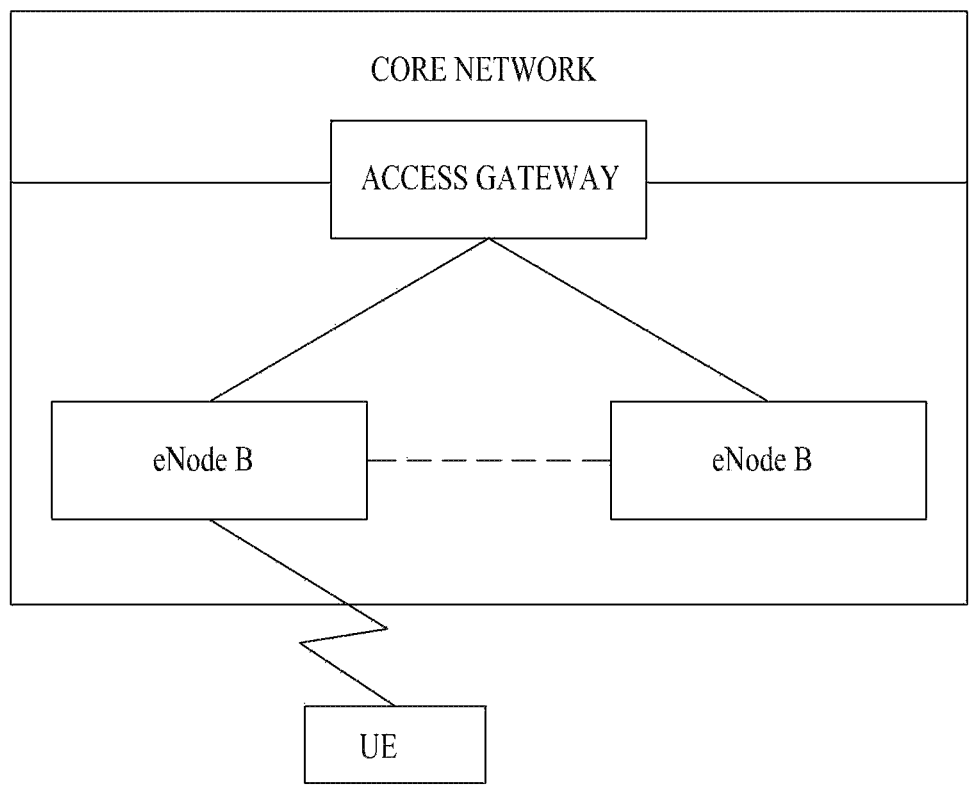
FIG. 1 is a schematic diagram of E-UMTS network structure as one example of a wireless communication system.
Figure 2:
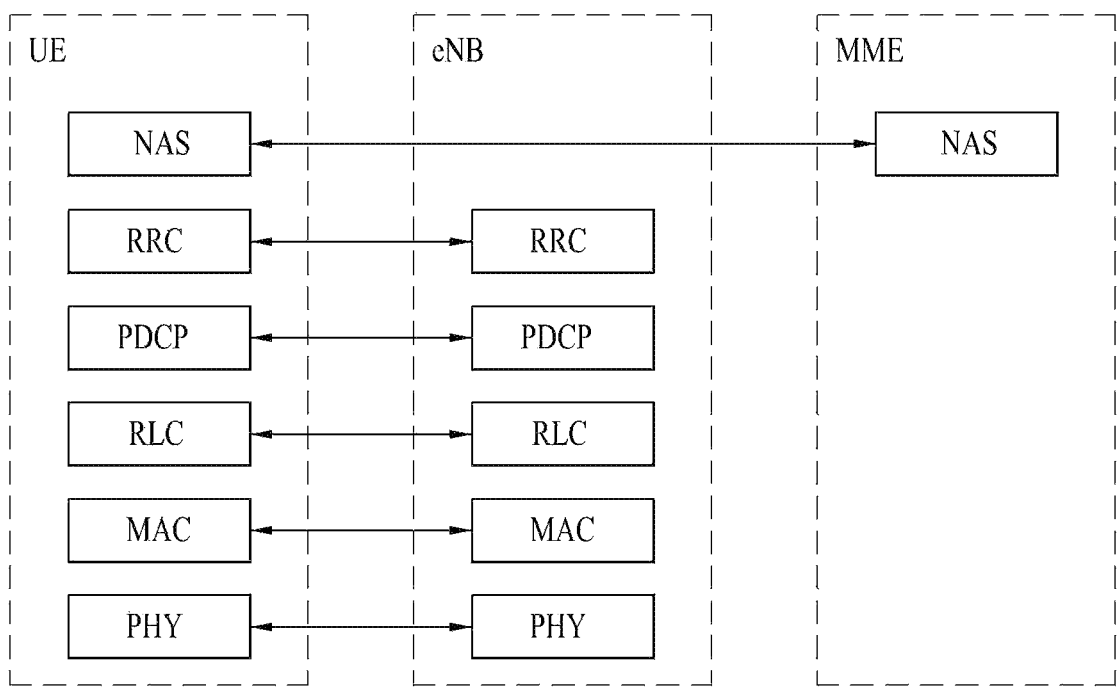
FIG. 2 is a diagram for structures of control and user planes of radio interface protocol between a 3GPP radio access network standard-based user equipment and E-UTRAN.
Figure 2:
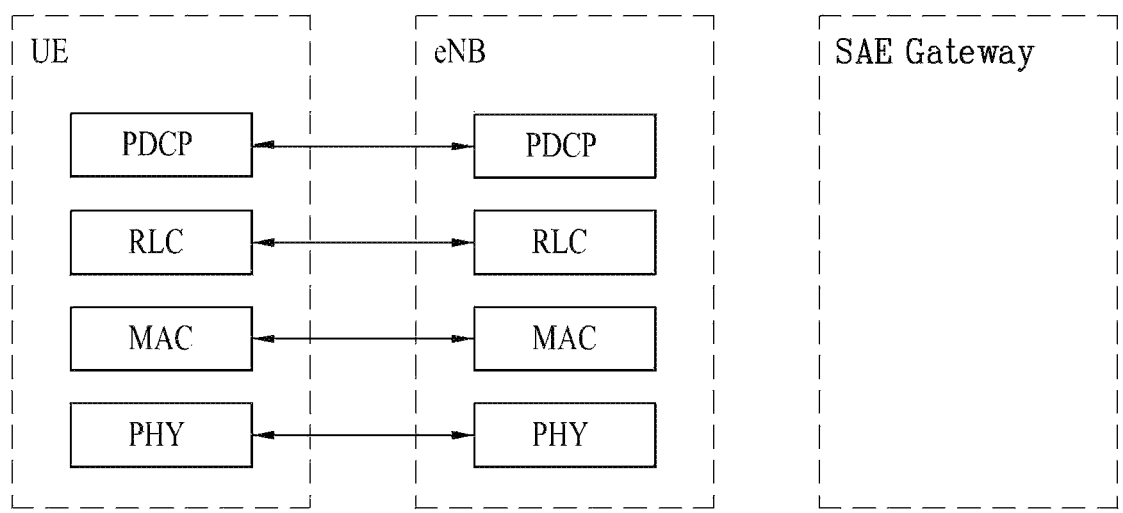

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.25, 2.5, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
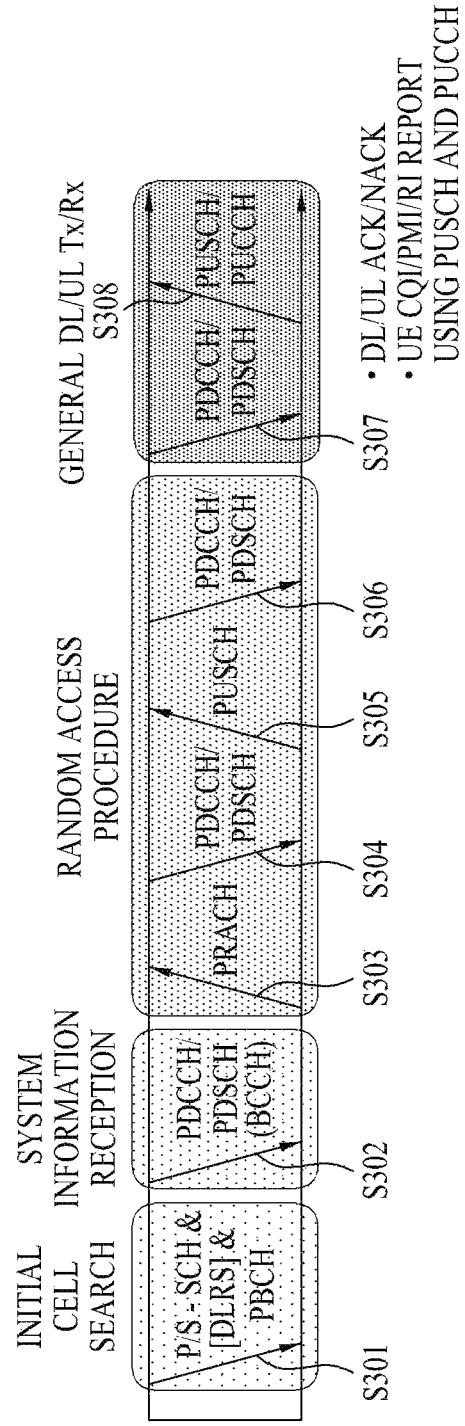
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
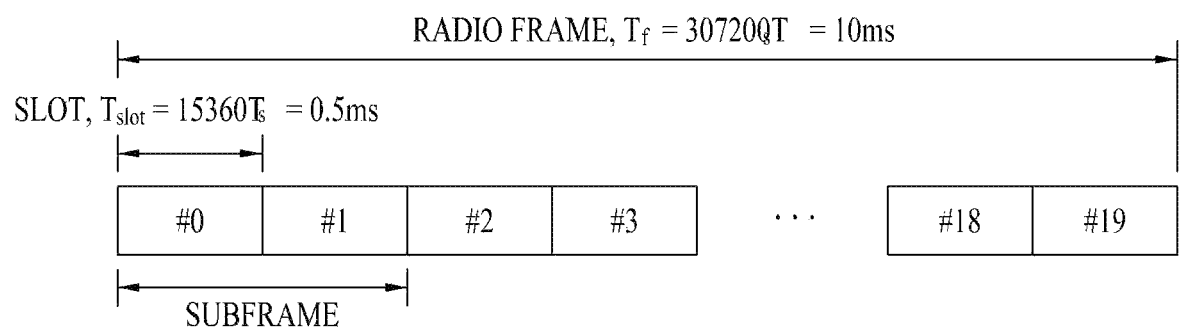
FIG. 4 is a diagram for a structure of a radio frame in LTE system.

FIG. 4 is a diagram for a structure of a radio frame in LTE system.

Referring to FIG. 4, one radio frame has a length of 10 ms ($327{,}200 \times T_S$) and is constructed with 10 subframes in equal size. Each of the subframes has a length of 1 ms and is constructed with two slots. Each of the slots has a length of 0.5 ms (15,360×$T_S$). In this case, $T_s$ indicates a sampling time and is represented as $T_s$=1/(15 kHz×2048)=3.2552× $10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
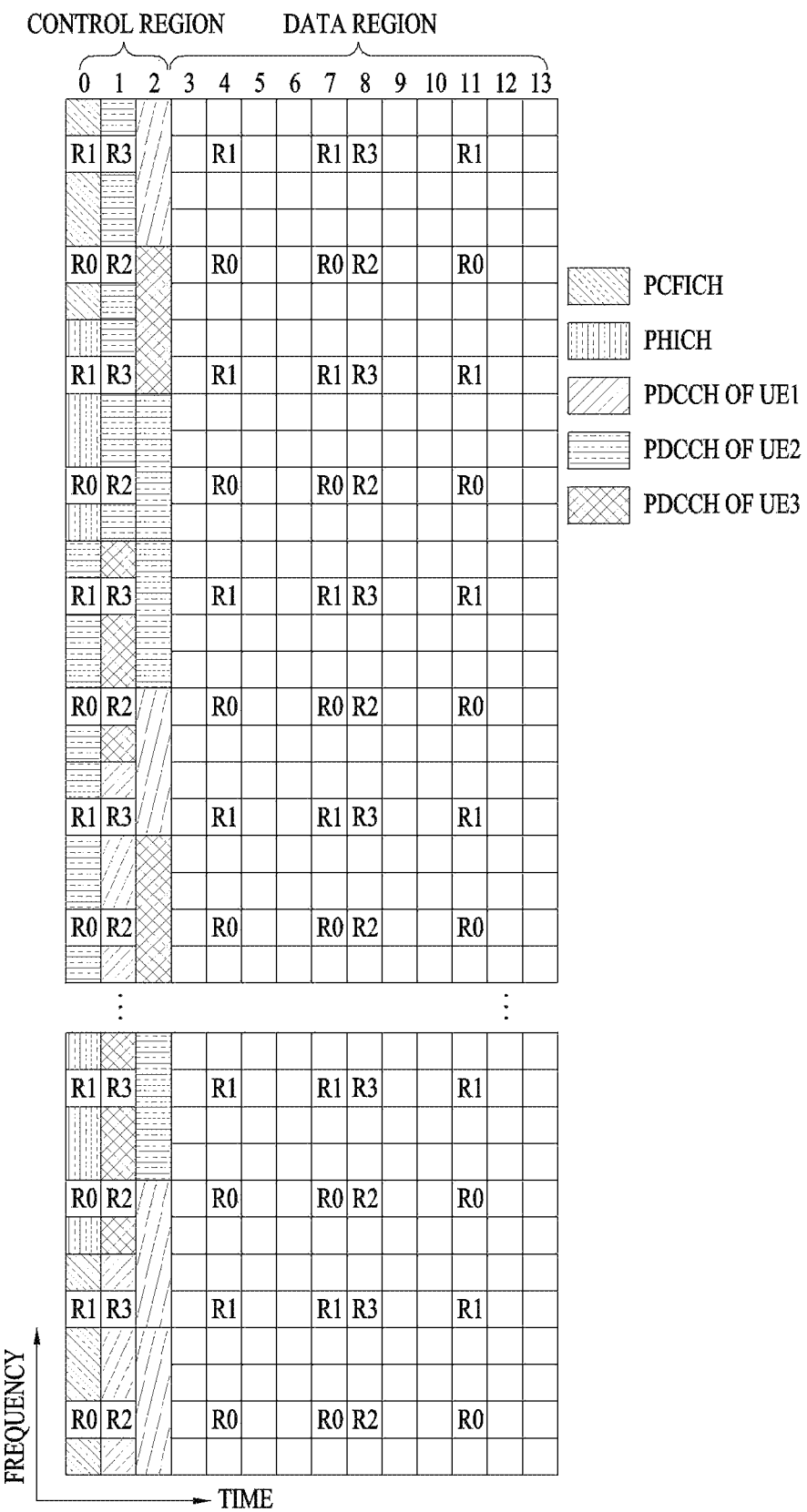
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
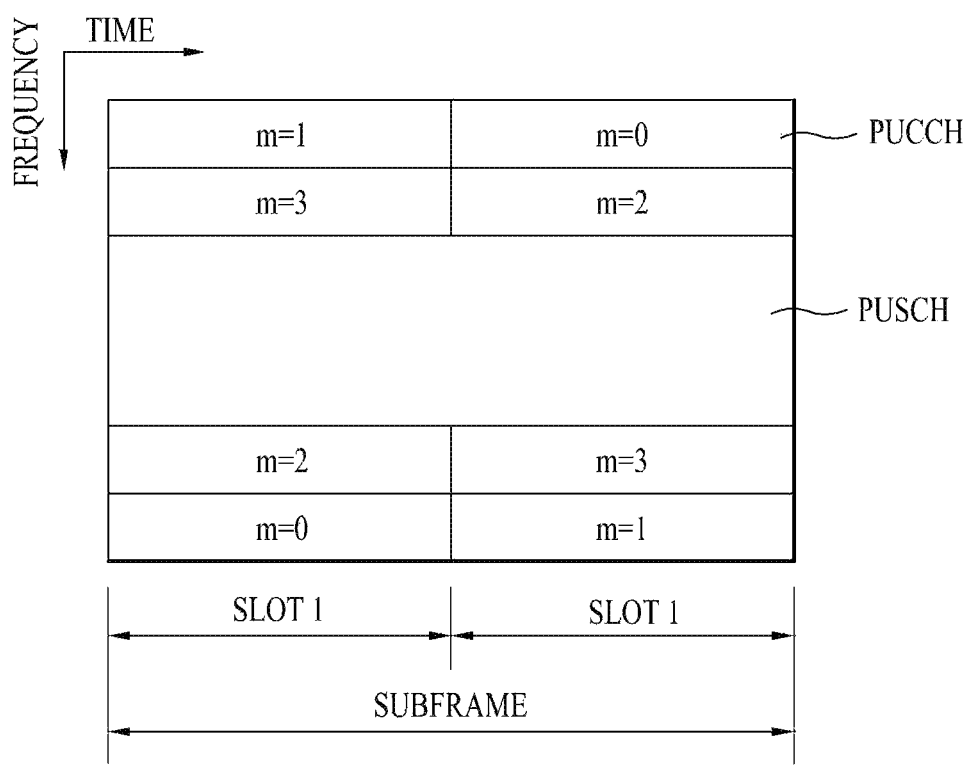
FIG. 6 is a diagram for a structure of an uplink subframe frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following, D2D (device to device) communication is explained.

D2D (device to device) communication literally means communication between an electronic device and an electronic device. In a broad sense, the D2D communication means wired or wireless communication between electronic devices or communication between a device controlled by a human and a machine. Yet, recently, the D2D communication generally indicates wireless communication performed between an electronic device and an electronic device without human involvement.

According to a D2D communication scheme or a UE-to-UE communication scheme, data can be exchanged between UEs without passing through a base station. A link directly established between devices can be referred to as a D2D link or a sidelink. The D2D communication has merits in that latency is reduced compared to a legacy base station-centered communication scheme and a less radio resource is required, and the like. In this case, although a UE corresponds to a terminal of a user, if such a network device as an eNB transmits and receives a signal according to a communication scheme between UEs, the network device can be considered as a sort of UEs.

In order to perform D2D communication, it is necessary to obtain time synchronization and frequency synchronization between two UEs. In general, if the two UEs belong to the coverage of an eNB, the two UEs are synchronized by a PSS/SSS, CRS, or the like transmitted by the eNB and the time/frequency synchronization can be maintained between the two UEs in a level that the two UEs are able to directly transmit and receive a signal.

Meanwhile, a D2D transmission signal transmitted through a sidelink can be mainly divided into a discovery use and a communication use. A discovery signal corresponds to a signal used by a UE to determine a plurality of UEs adjacent to the UE. As an example of a sidelink channel for transmitting and receiving the discovery signal, there is a sidelink discovery channel (PSDCH: Physical Sidelink Discovery Channel). A communication signal corresponds to a signal for transmitting general data (e.g., voice, image information, etc.) to be transmitted by a UE. As an example of a sidelink channel for transmitting and receiving the communication signal, there are a physical sidelink broadcast channel (PSBCH), a physical sidelink shared channel (PSSCH), a physical sidelink control channel (PSCCH), and the like.

Figure 7:
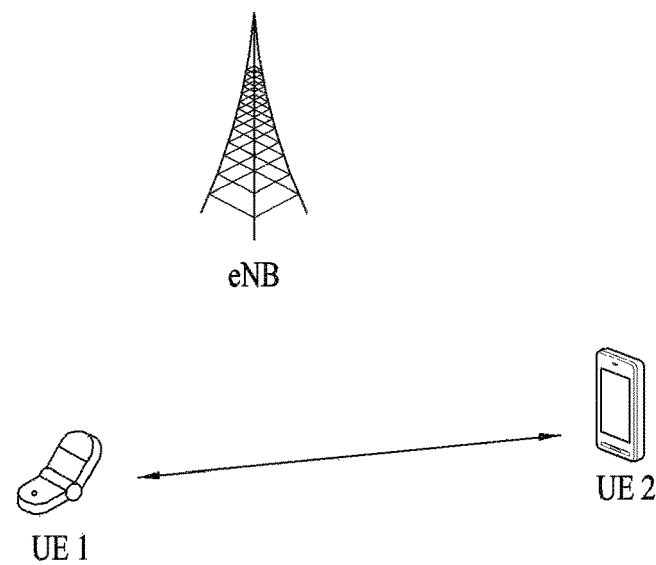
FIG. 7 is a diagram for an example of a D2D resource pool for performing D2D communication.
Figure 7:
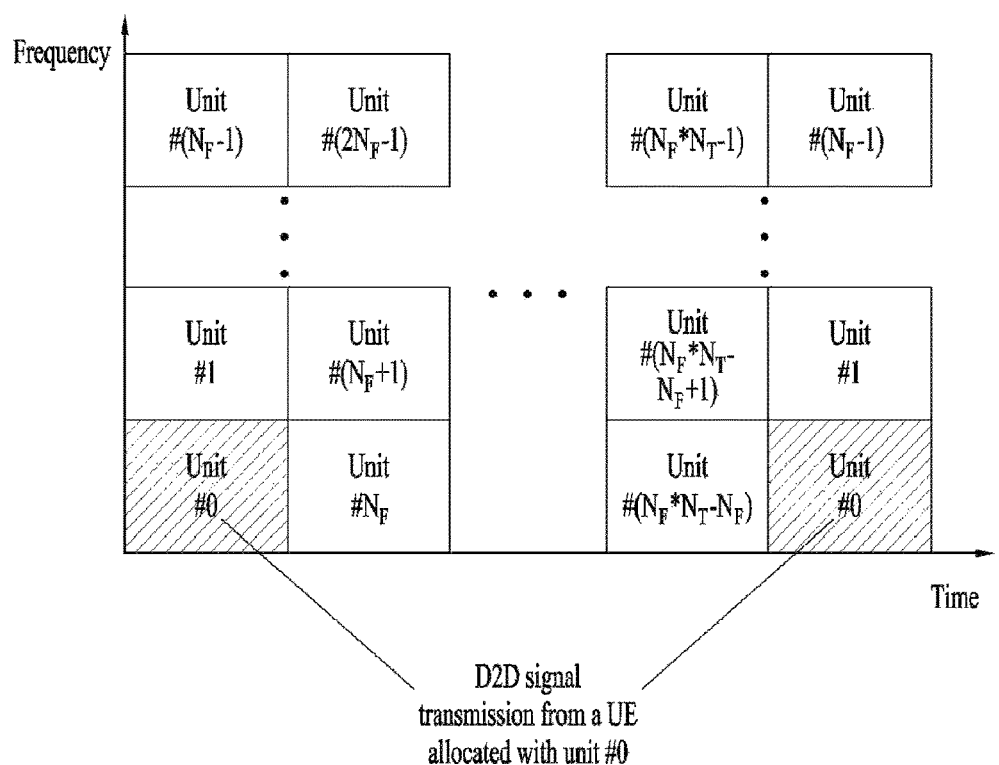

FIG. 7 shows an example of a UE1, a UE2 and a resource pool used by the UE1 and the UE2 performing D2D communication. In FIG. 7 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 7 (b) shows an example of configuring a resource unit. Referring to FIG. 7 (b), the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIG. 7, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a HE directly selects a transmission resource from a predetermined resource region or a resource region indicated by the eNB, it is referred to as a type 1.

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

In general, SA is a transmission channel indicating time and frequency positions of transmission resources of data and including supplementary information necessary for data decoding. Such an SA resource pool may be separated from a data pool or may partially overlap a data pool to partially share a data domain. In addition, the data pool and the SA resource pool may not be separated in the time domain but may be separated in the frequency domain.

Meanwhile, V2X communication has been discussed in association with D2D communication. V2X may include V2V between vehicle UEs, V2P between a vehicle and another type of UE, and V2I between a vehicle and a roadside unit (RSU). Hereinafter, embodiments of the present invention of a resource allocation method related to V2X based on the above description will be described. In the following description, a UE may be a vehicle or a UE attached to a vehicle.

Figure 8:
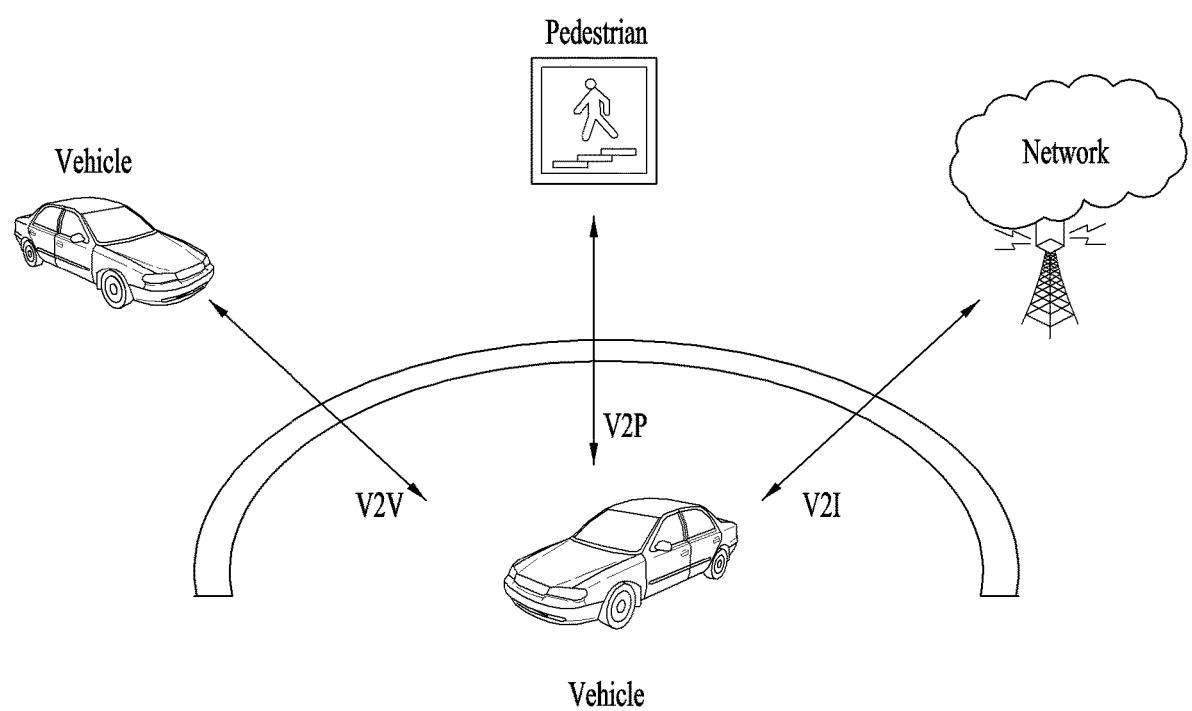
FIG. 8 is a diagram for explaining a V2V scenario.

FIG. 8 is a diagram illustrating V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby.

Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB.

Yet, various items should be considered for a process for implementing V2X communication in a vehicle. This is because astronomical costs are required for the installation of traffic safety facilities such as V2X base station and the like. Namely, in order to support V2X communication on all vehicle-movable roads, it is necessary to install hundreds or thousands of V2X base stations or more. Moreover, since each network node accesses Internet or a central control server using a wired network basically for stable communication with a server, installation and maintenance costs of the wired network are high.

Meanwhile, in case of performing D2D, it may have a case that load is concentrated on a certain region. For example, similar to V2X communication, communication can be simultaneously performed at specific time and a specific region. In this case, since it is highly probable that a collision occurs between terminals, it is necessary to have a resource selection method more enhanced than a method of randomly selecting a resource in a legacy LTE D2D system. As an enhanced resource selection method, study on a sensing-based resource allocation scheme is in progress.

In D2D that direct communication is performed between terminals, a transmission UE can autonomously perform resource allocation. In particular, a transmission UE can perform distributed resource allocation to determine an appropriate resource to be used by the transmission UE rather than centralized resource allocation performed by an external device such as a base station to designate a transmission resource of an individual transmission UE. In this case, it is unable to fundamentally prevent a resource collision that two transmission UEs select a duplicated time/frequency resource. Yet, if a resource allocation status of a different UE is appropriately monitored, it may be able to minimize a resource collision. Specifically, a transmission UE determines whether or not a different transmission UE uses a specific time/frequency resource. If it is determined as the different transmission LTE use the specific time/frequency resource, the transmission UE may not select the specific time/frequency resource. In particular, an operation of determining whether or not a different UE uses a specific resource is referred to as carrier sensing or resource sensing. In this case, the time/frequency resource may correspond to a time resource, a frequency resource, or a time and frequency resource.

A UE performs resource sensing for prescribed time before a message is transmitted between UEs (e.g., vehicles). If it is determined as a resource is not used by a different UE, the UE performs sensing-based resource allocation in the resource to maintain resource selection for prescribed time. By doing so, neighboring UEs can stably perform an interference measurement operation and a resource collision probability can be reduced. In particular, it is able to efficiently perform resource selection.

Although a resource not occupied by other UEs is selected based on sensing, interference may occur due to transmissions of other UEs. In this case, although it is able to use a method of randomly selecting a resource from among unoccupied resources, a resource can be selected in consideration of interference.

In the following, a method of selecting or allocating a resource in consideration of interference from other UEs is explained. In the present invention, a method of selecting a D2D resource can be applied to a case that a UE autonomously performs an operation of selecting a resource. For example, the resource selection method of the present invention can be applied when a UE selects a resource form a certain resource pool or selects a resource from among resources not occupied by a different UE based on sensing like resource selection for V2X.

D2D Resource Selection

In the following description, a principle of selecting a D2D resource proposed in the present invention is explained. In particular, in the present invention, assume a case that a UE scans communication status of other UEs in a resource unit belonging to a resource pool and selects a resource. In this case, the UE can identify interference status generated by other UEs in each resource unit. The interference status can be identified by detecting signals which are known in advance and transmitted by other UEs, e.g., a DM-RS (demodulation reference signal) and checking reception power of the signals. Or, it may consider the sum of energy of all signals detected in a resource unit as interference status of the resource unit. In order to explain the present invention, status of a resource unit described in the following is defined.

If interference status identified in a specific resource unit is equal to or less than a prescribed level, for example, if energy detected in the resource unit is equal to or less than a given reference value, it is determined as the resource unit has no link used in a mutual interference relation. This is referred to as a clean unit.

If interference status identified in a specific resource unit is equal to or greater than a prescribed level, the resource unit is referred to as a dirty unit. In the dirty unit, one of UEs performs D2D within a range affecting with each other. As a detected interference level is lower, it can be determined as a UE located at far is used for transmission.

Based on the definitions above, the present invention proposes three principles described in the following as a basic principle of resource allocation for D2D. Yet, although there exists a prescribed time interval between timing of identifying interference status and timing of practically allocating a resource, assume that an identical resource is used during the prescribed time interval in general.

Principle 1) If the sufficient number of clean units exist, it may be preferable to separate resources used by each transmission UE from each other using the clean units and prevent mutual interference from the start.

Principle 2) When a specific UE receives a D2D signal, if the UE receives the D2D signal using a clean unit, it is a best scenario. If the UE receives a D2D signal using a dirty unit, it may be profitable when an interference level is relatively low. This is because, in the aspect of reception, interference examined by a corresponding UE exactly corresponds to interference affecting reception performance.

Figure 9:
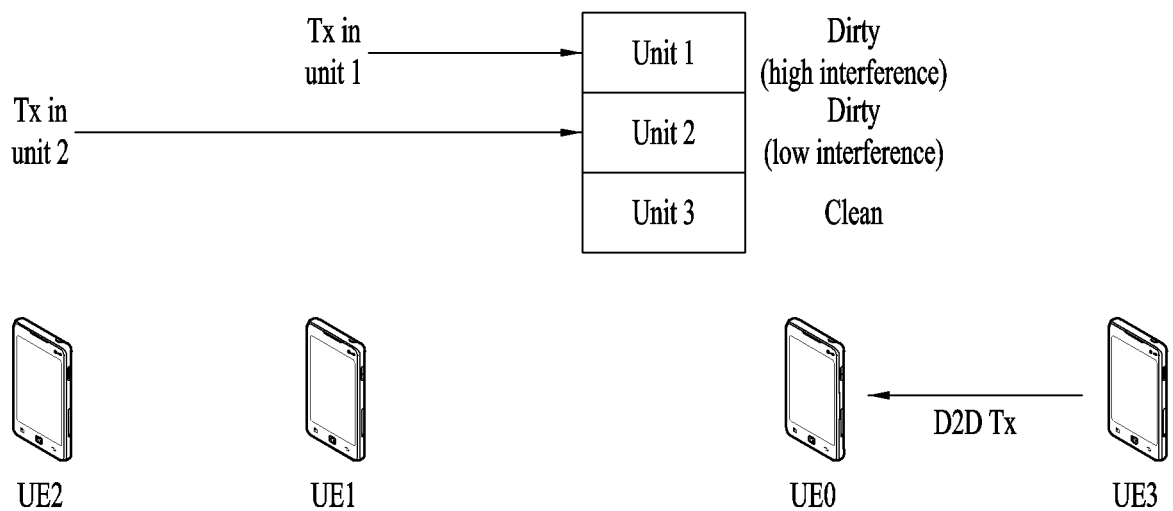
FIG. 9 is a diagram for an example of allocating a resource to receive a D2D signal according to embodiment of the present invention.

FIG. 9 is a diagram for an example of allocating a resource to receive a D2D signal according to embodiment of the present invention. In particular, in FIG. 9, assume that a UE receiving a D2D signal corresponds to a UE0.

Referring to FIG. 9, when statuses of a resource unit 1, a resource unit 2, and a resource unit 3 are identified as FIG. 9, if a UE3 corresponding to a new transmission UE selects the resource unit 3 corresponding to a clean resource, it is able to optimize reception performance in the aspect of the UE0. In case of using a dirty unit, it may be preferable to use a resource unit 2 that interference is relatively low.

Principle 3) When a specific UE transmits a D2D signal, if the UE uses a dirty unit, it may be preferable to use a resource unit of which an interference level is relatively high. Regarding this, it shall be described in more detail in the following.

A. Although a UE adjacent to a transmission UE experiences high interference similar to interference examined by the transmission UE in a corresponding resource unit, since signal power delivered from the transmission UE is high, the UE can overcome the high interference. This is explained with reference to the attached drawing.

Figure 10:
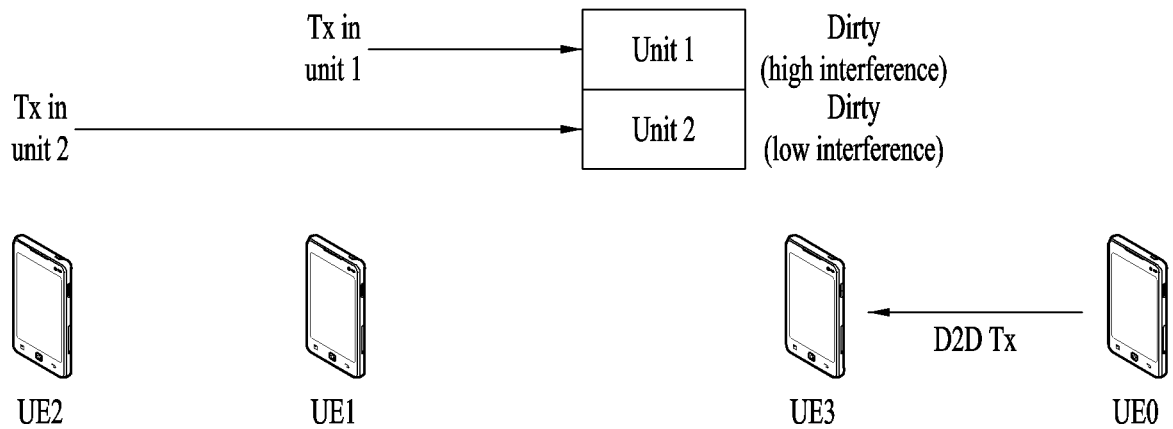
FIG. 10 is a diagram for an example of allocating a resource to transmit a D2D signal according to embodiment of the present invention.

FIG. 10 is a diagram for an example of allocating a resource to transmit a D2D signal according to embodiment of the present invention. FIG. 10 exemplary shows a case that a UE0 transmits a signal when a UE1 and a UE2 perform transmission in a resource unit 1 and a resource unit 2, respectively. In this case, in the aspect of the UE3 adjacent to the UE0, although interference of the resource unit 1 is higher, the UE3 can easily overcome the interference because distance from the UE0 is short.

B. If a transmission UE does not use a resource unit of which interference is low, a reception UE examining low interference similar to the transmission UE can use the resource unit for receiving a D2D signal.

In particular, since it is probable that a dirty unit of which an interference level is low is to be used for transmitting a D2D signal of a UE positioned at relatively far, if a specific UE uses the resource unit to transmit a D2D signal, it works as strong interference to reception of other UEs adjacent to the specific UE. Referring back to FIG. 10, if the UE0 transmits a signal using the resource unit 2 of which an interference level is low, performance of the UE3 adjacent to the UE0 for receiving a signal of the UE2 far from the UE3 is considerably deteriorated. Hence, it may be preferable that the UE0 transmits a signal using the resource unit 1 of which an interference level is low.

In the following, methods of performing resource allocation in a manner of applying the aforementioned principles are explained.

First of all, a method for a transmission UE to select a resource based on interference measured for each resource unit without exchanging a separate signal between UEs is explained.

Figure 11:
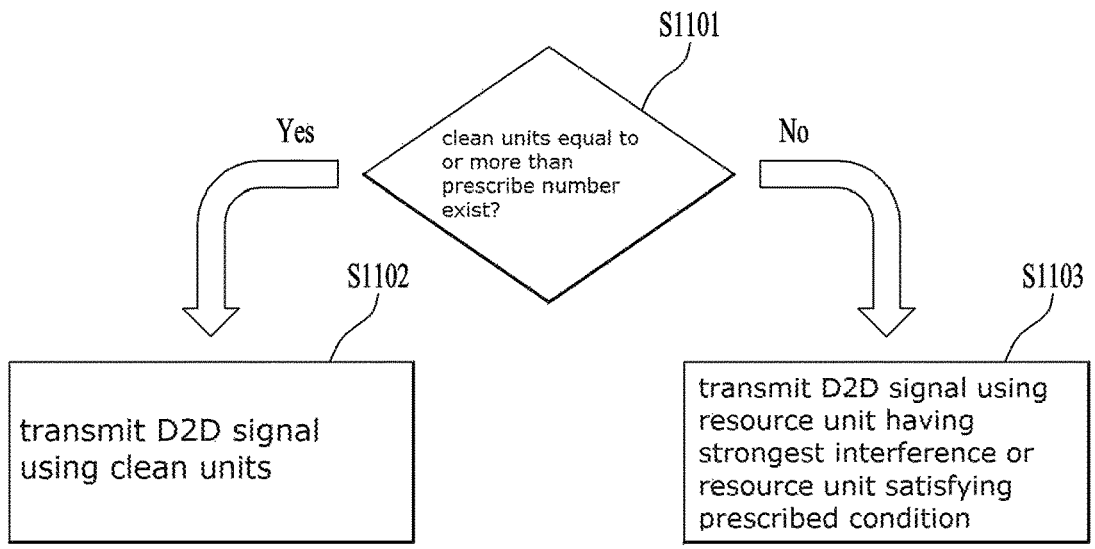
FIG. 11 is a flowchart for an example of selecting a resource for D2D communication according to embodiment of the present invention.

FIG. 11 is a flowchart for an example of selecting a resource for D2D communication according to embodiment of the present invention.

Referring to FIG. 11, in the step S1101, the aforementioned principle 1 is performed, i.e., whether or not a clean unit exists more than a prescribed level is determined. If exists, a signal is transmitted to one of clean resources in the step S1102.

If a condition of the principle 1 is not satisfied, it is necessary for a transmission UE to select one of dirty units in the step S1103. In this case, the transmission UE is able to select a resource unit of strongest interference according to the principle 3. Yet, in this case, a case that a plurality of UEs continuously select an identical resource may occur. In order to mitigate the case, the transmission UE may consider additional conditions described in the following.

a. It is able to randomly select one of resource units at which an interference level of top x % is detected.

b. Or, it is able to randomly select one of dirty units at which interference equal to or stronger than a prescribed level appears. For example, if an interference level is configured to be identical to a reference for determining whether a resource unit corresponds to a clean unit or a dirty unit, it is able to randomly select one of dirty units.

c. Or, it may be able to prevent a dirty unit at which excessively high interference is detected from being selected by assuming that too many transmission UEs are concentrated on the dirty unit. As an example, it is able to prevent a dirty unit of which an interference level is equal to or stronger than a prescribed level from being selected or the dirty unit may have low priority in selection.

Figure 12:
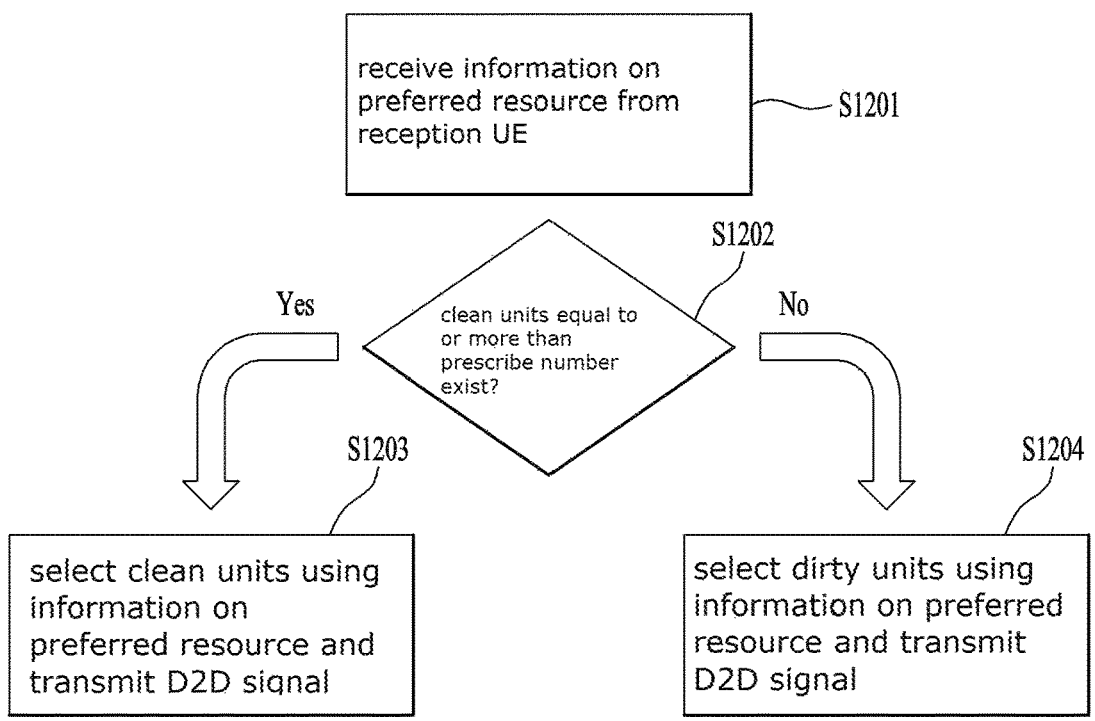
FIG. 12 is a flowchart for a different example of selecting a resource for D2D communication according to embodiment of the present invention.

Subsequently, a method of performing resource allocation by exchanging a prescribed signal between UEs is explained in the following. FIG. 12 is a flowchart for a different example of selecting a resource for D2D communication according to embodiment of the present invention.

Referring to FIG. 12, a UE informs a different UE of a resource preferred by the UE according to the second principle in the step S1201. In particular, a UE transmitting a D2D signal receives information on a resource preferred by the UE from a different UE.

In this procedure, since the information transmitted by the UE may target a plurality of unspecified transmission UEs, it may use a structure of a discovery signal corresponding to a signal that informs whether or not a UE exists. Specifically, each UE can notify a location of a clean unit examined from the view of the UE or a location of a dirty unit of which interference is low. Or, the UE may be able to notify a location of a resource, which is difficult to receive because very strong interference is examined, among dirty units.

The UE transmitting a D2D signal selects a resource unit for transmitting a D2D signal by utilizing the information received in the step S1201. Specifically, in the step S1202, the UE determines whether or not a clean unit examined in the UE exists more than a prescribed level according to the principle 1.

If exists, as shown in the step S1203, the UE transmits a signal by selecting a resource, which appears as a clean unit (or a dirty unit of low interference) to the UE, among resources declared as a clean unit (or a dirty unit of low interference) by other UEs via the preferred information in the step S1201. In case of transmitting a D2D signal to a plurality of reception UEs, it may consider a resource commonly declared as a clean unit (or a dirty unit of low interference) by UEs belonging to a plurality of the reception UEs.

However, if a clean unit does not satisfy a prescribed level, as shown in the step S1204, the UE transmits a signal by selecting a dirty unit appearing as strong interference to the UE from among resources declared as a clean unit (or a dirty unit of low interference) by other UEs via the preferred information in the step S1201. In case of transmitting a signal to a plurality of reception UEs, it may consider a resource commonly declared as a clean unit (or a dirty unit of low interference) by UEs belonging to a plurality of the reception UEs. In this case, since a case of continuously selecting an identical resource by a plurality of UEs may occur, in order to mitigate the case, a transmission UE may consider the aforementioned additional conditions a to c.

Meanwhile, in a series of the aforementioned methods, it is necessary to define a concept that the number of clean units is equal to or greater than a prescribed level in more detail. In this case, a case that at least one or more clean units exist, a case that clean units exist more than a predetermined number, or a case that a ratio of clean units occupying a resource pool is equal to or greater than a predetermined value, and the like may correspond to the concept.

Meanwhile, in the aforementioned operations, a reference for determining whether a resource unit is clean or dirty can be determined by a plurality of D2D transmission and reception parameters. More specifically, when a specific resource is clean, it may indicate that a different D2D transmission UE does not exist within a range considered by the resource unit. And, a D2D transmission range can be determined by a transmission and reception parameter. Examples of the parameter include transmit power, MCS (modulation and coding scheme) in use, a transmission bandwidth, and the like.

For example, in case of the MCS, if a transmission UE uses a higher MCS, it may indicate that a range of a D2D link is relatively short. This is because it is necessary to have a reception signal of higher quality to decode the higher MCS. Hence, in the aspect of the UE using the higher MCS, the UE may increase an interference reference for determining whether a resource unit is clean or dirty to consider a part that a range is shortened. As a result, a UE intending to use the higher MCS may regard the more number of resource units as a clean unit. As a result, it is able to see a trend that a case of using the higher MCS increases compared to a case of using lower MCS of which the number of clean units is less. This may be matched with a phenomenon that a probability of exiting of a transmission UE within a range decreases as the range is getting short. Similarly, if transmit power is weak or a bandwidth is wide, a range becomes short as well. Hence, it may increase a reference for determining whether a resource unit is clean or dirty.

Additionally, as a different example of the D2D transmission and reception parameter, there is a parameter for indicating whether transmission corresponds to initial transmission for given information or retransmission for previously transmitted information. As an example, it may change a reference for identifying a clean unit or a dirty unit according to the initial transmission and the retransmission. In particular, in case of the initial transmission, it may be able to increase a reference interference level for determining whether a resource unit is clean or not and select a resource less interfered by interference to enable a UE located at far to receive a signal. On the contrary, in case of the retransmission, it may be able to decrease a reference interference level for determining whether a resource unit is clean or not and regulate a resource of strong interference to be used. This is because, although interference is strong in a corresponding resource unit, it is able to successfully finish reception in a manner of combining the resource unit with previously transmitted information.

Similar to this, definition on the sufficient number of clean units can also be changed. In case of attempting to perform initial transmission, it may be able to configure a reference for the sufficient number of clean units to be small. Hence, if there is a clean unit, a transmission UE uses the clean unit. On the contrary, in case of performing retransmission, the reference for the sufficient number of clean units can be configured to be big. Hence, although there are some clean units, it may be able to induce the transmission UE to use a dirty unit.

In addition, if a reception UE is able to deliver a feedback on whether or not reception is successfully finished, it is able to control a resource selection criterion of a transmission UE based on the feedback. As an example, when the feedback on the successful reception (more than a prescribed rate during prescribed time) is received from the reception UE, if a resource in use corresponds to a clean unit under a determination that the transmission UE continuously maintains the currently used resource or the transmission UE has selected a resource of excessively good quality, it may be able to make the transmission UE use a dirty unit instead of the clean unit. On the contrary, if the transmission UE receives a feedback on a reception failure (more than a prescribed rate during prescribed time) from the reception UE, the transmission UE may perform an operation of changing to a dirty unit of which an interference level is lower or a clean unit.

D2D Resource Selection and Transmit Power

In the following, the present invention proposes a method of determining transmit power to be used at transmission timing. First of all, as an example of the present invention, a method for a D2D transmission UE to configure transmit power in each resource unit is proposed by utilizing the aforementioned principle of the D2D resource allocation.

For example, assume that a D2D transmission UE selects a specific clean resource as a resource unit for transmission. In particular, it indicates that a different D2D link does not exist within a valid region of the resource. Hence, it is not necessary for the transmission UE to consider interference to a different D2D link. In this case, it is able to permit a UE to perform transmission with high power (e.g., transmit power as high as possible). Of course, it indicates that it is able to permit the transmission UE to perform transmission with high power. In this case, actual transmit power of a UE can be configured with a specific value equal to or less than a permitted value in consideration of a battery status and the like of the UE.

On the contrary, it may assume that a D2D transmission UE selects a specific dirty resource as a resource unit for transmission. In particular, it indicates that a different D2D link exists within a valid region of the resource. Hence, it is necessary for the transmission UE to set a limit on transmit power of the transmission UE with an appropriate level in consideration of interference to the different D2D link. In particular, if an interference level examined by the transmission UE in the dirty resource unit is lower, transmit power can be configured to be lower in the unit.

Referring back to FIG. 10, when a UE0 uses a resource unit 2 where low interference is examined, if the UE0 uses high power, transmission of the UE0 may act as strong interference to a UE3 adjacent to the UE0. In this case, since the UE3 receives a signal from a UE2 with low power, the UE3 has a problem in receiving a signal from the UE2. However, when the UE0 uses a resource unit 1 where high interference is examined, since the UE3 adjacent to the UE0 receives a signal from a UE1 with relatively high power, although the transmit power of the UE0 is relatively high, the UE3 is able to receive the signal from the UE1.

For example, transmit power in a dirty resource can be configured as follows. Assume that an interference level detected by a transmission UE in a resource unit n corresponds to $I_n$. In this case, in order to make SIR (signal-to-interference ratio) or SINR (signal-to-noise plus interference ratio) of a UE, which is positioned in the vicinity of the transmission UE and receives a signal with the detected interference level $I_n$, to be equal to or greater than a prescribed level (T), transmit power of the transmission UE can be configured to be equal to or less than $I_n/T$. If power of a ratio corresponding to a among the transmit power of the transmission UE acts as interference to a different UE adjacent to the transmission UE, the transit power of the transmission UE can be represented by $I_n/(a*T)$. As a result, if a resource has strong interference, transmit power can be configured by a big value in the resource. If a resource has weak interference, transmit power can be configured by a small value in the resource. Of course, it may be able to apply a separate restriction to the upper limit and/or the lowest limit of power capable of being configured by the transmission UE.

Meanwhile, when a resource for performing D2D communication is selected, a UE may select a resource advantageous for transmission timing from among a resource of strong interference and a resource of low interference. In this case, when a resource is selected, it may consider transmit power to be used at transmission timing. In the following, a method of selecting a resource in further consideration of a relation with transmit power is proposed.

In the embodiments of the present invention, a resource can be selected from a D2D resource pool or can be selected from resources unoccupied by other UEs based on the aforementioned resource sensing. Moreover, the following description can be performed on dirty resources rather than clean resources in the aspect of resource selection. In this case, although it is not explicitly described in the following description, following embodiments can be applied to dirty resources induced by performing the procedures shown in FIGS. 11 and 12.

If the aforementioned transmit power configuration scheme of the transmission UE is applied, it may consider transmit power in case of determining a resource to be used by the transmission UE. More specifically, a transmission resource to be used by a UE can be determined in consideration of both interference detected in each resource unit and transmit power.

For example, if it is assumed that transmission is performed in each resource unit, the transmission UE can calculate transmit power available in each resource unit. The transmission UE can select an appropriate resource unit in consideration of both an interference level detected in each resource unit and available transmit power.

Figure 13:
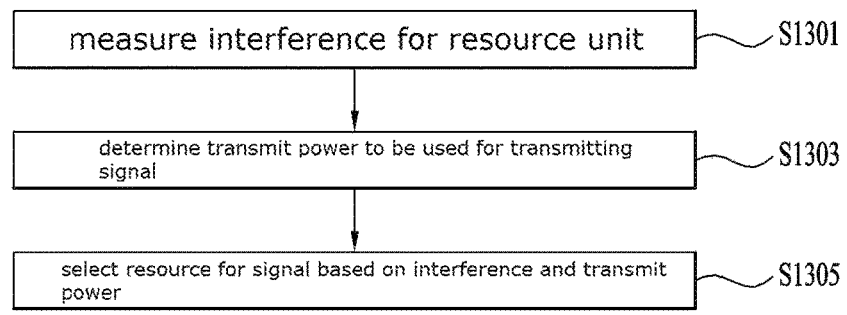
FIG. 13 is a flowchart for an order of selecting a resource based on transmit power according to one embodiment of the present invention.

FIG. 13 is a flowchart for an order of selecting a resource based on transmit power according to one embodiment of the present invention.

Referring to FIG. 13, interference or an interference level is measured according to a resource unit in the step S1310. In the step S1303, transmit power to be used for transmitting a signal is determined. For clarity, interference measurement and determination of transmit power are depicted as the step S1301 and the step S1303. Yet, the steps can be performed at the same time. Or, the determination of the transmit power can be performed prior to the measurement of the interference level. In the step S1305, a unit to be used for signal transmission is selected based on the measured interference and the transmit power.

As an example of performing resource selection in consideration of transmit power, when a UE performs transmission using high transmit power, the UE may not use a resource showing relatively low interference to a different UE and select a resource showing relatively high interference. As a result, if transmission is performed using high transmit power, a range of resources capable of being selected can be narrowed down. On the contrary, when transmission is performed using low transmit power, interference influencing on a different UE could be insignificant. In particular, when transmission is performed using low transmit power, a resource can be selected from a wider range.

Meanwhile, when a UE intends to perform transmission with high transmit power, if the UE transmits a signal via a specific resource at which interference of a median level is detected, interference influencing on a different UE could be significant. Hence, when the UE intends to perform transmission with high transmit power, the UE may timidly select a resource unit in consideration of the interference influencing on the different UE.

To this end, as a different example of performing resource selection in consideration of transmit power, it may configure a threshold of interference associated with the transmit power of the UE. For example, the UE can select a resource unit(s) having interference equal to or less than the threshold. When the UE intends to transmit a signal with first transmit power, if an interference level of a specific resource is greater (or, equal to or greater) than a threshold associated with the first transmit power, the UE may not select the resource as a transmission resource. On the contrary, if the interference level is equal to or less (or, less) than the threshold, the UE may select the resource.

In this case, when the threshold is associated with the transmit power, it means that the threshold may have a different value depending on the transmit power. In particular, the threshold may correspond to a value that varies according to the transmit power. As mentioned in the foregoing description, in case of low transmit power, although a resource is selected from a wider range, since an impact influencing on a different UE is not significant, the threshold can be configured with a higher value. On the contrary, in case of high transmit power, the threshold can be more timidly determined in consideration of an impact influencing on a different UE. When a UE performs transmission using first transmit power, a threshold associated with the first transmit power is referred to as a first threshold. When the UE performs transmission using second transmit power, a threshold associated with the second transmit power is referred to as a second threshold. In this case, if the first transmit power is greater than the second transmit power, the first threshold can be configured to be smaller than the second threshold.

In particular, the UE can select a transmission resource based on a threshold related to transmit power. In this case, the UE can select resource units equal to or less than the threshold. According to the abovementioned operation, if transmit power to be used by the UE at transmission timing is high, resources capable of being used by the UE are relatively reduced. Hence, if resources necessary for performing transmission are insufficient, it is necessary to adjust the resources.

A method for a UE to adaptively select a resource and transmit power is proposed based on the aforementioned scheme.

Figure 14:
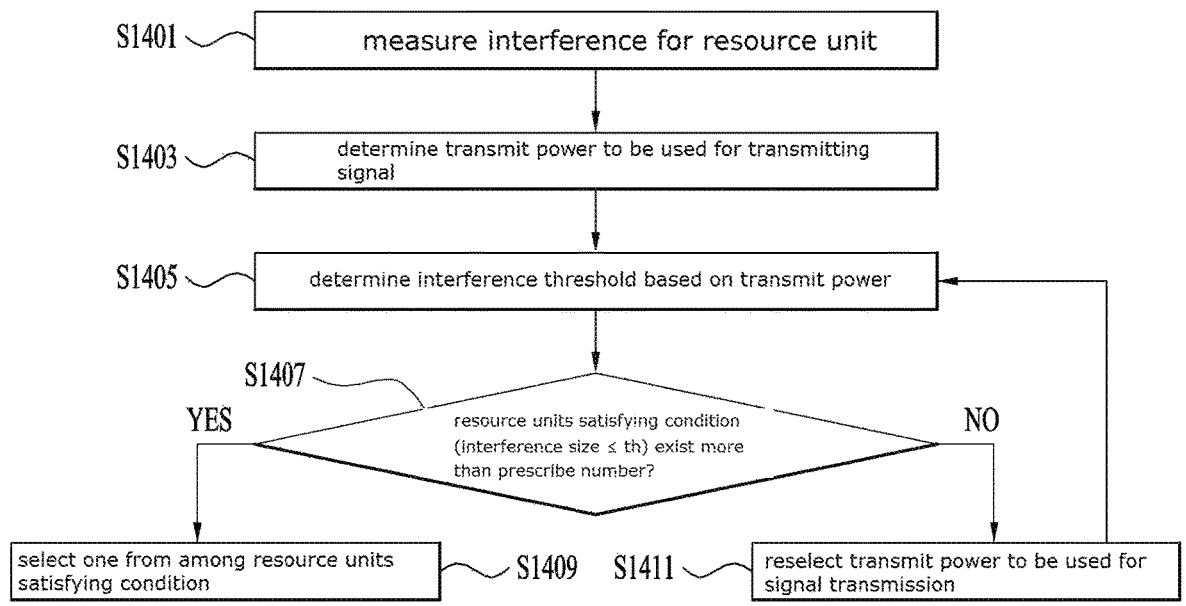
FIG. 14 is a flowchart for an order of a method for selecting transmit power and a transmission resource according to a different embodiment of the present invention.

FIG. 14 is a flowchart for an order of a method for selecting transmit power and a transmission resource according to one embodiment of the present invention.

Referring to FIG. 14, a UE measures interference for resource units belonging to a resource pool in the step S1410. In the step S1403, the UE determines transmit power to be used at transmission timing. In this case, the transmit power determined by the UE is referred to as first transmit power. In the step S1405, the UE determines a threshold of interference based on the first transmit power. The determined threshold is referred to as a first threshold.

In the step S1407, the UE determines whether or not resource units satisfying a prescribed condition are equal to or greater than a prescribed number. In this case, the prescribed condition may correspond to a case that the interference level is equal to or less (or, less) than the first threshold. To this end, the UE calculates a usable resource unit(s) based on the first threshold. The usable resource unit(s) is referred to as a first candidate resource unit. In the step S1407, it is able to check whether or not a size of the first candidate resource unit(s) is sufficient enough for transmitting a reserved signal.

In the step S1409, if the number of the first candidate resource unit(s) satisfying the condition is equal to or greater (or, greater) than a prescribed number, the UE selects a transmission resource from among the first candidate resource unit(s).

Yet, in the step S1411, if the number of the first candidate resource unit(s) is equal to or less (or, less) than the prescribed number, the UE selects transmit power again. In particular, the UE determines transmit power again in the step S1411. In this case, for clarity, the determined transmit power is referred to as second transmit power. In other word, the UE can adjust or change the first transmit power with the second transmit power. If the first transmit power is configured with a big value, a threshold can be configured with a relatively smaller value. In this case, if the number of available resources is not sufficient, the second transmit power can select a value smaller than the first transmit power. As a result, the threshold is configured with a relatively bigger value and the number of available resources increases.

After the step S1411 is performed, the steps from the step S1405 can be repeated based on the newly determined second transmit power. Specifically, the UE determines a threshold of interference again based on the second transmit power. In this case, the determined threshold is referred to as a second threshold. Similarly, the UE calculates a second candidate resource unit(s) based on the second threshold. If the number of the second candidate resource unit(s) satisfies a prescribed number, the UE selects a transmission resource from among the second candidate resource unit(s).

The repetition can be performed until the number of candidate resource units satisfying the prescribed condition becomes equal to or greater than the number of resource units necessary for performing the signal transmission (i.e., a prescribed number).

If resource units sufficient enough for performing the signal transmission are calculated, a transmission resource to be used for performing transmission is selected from among the second candidate resource units. As mentioned earlier in FIG. 10 to FIG. 11, in order to prevent a resource collision with a different UE, a resource selection method such as the embodiments of FIGS. 10 to 11 can be further performed.

If a UE adaptively selects a resource and transmit power, the UE can transmit a signal to a different UE via the selected resource using the determined transmit power. In this case, the transmit power corresponds to transmit power which is selected to transmit a signal using all resource units necessary for transmitting the signal.

The UE can adaptively select transmit power and a transmission resource unit based on the aforementioned method. In particular, according to the method, the UE can autonomously control the transmit power in consideration of interference and select a transmission resource unit appropriate for the transmit power.

Meanwhile, the aforementioned operation is naturally applicable when transmit power of a UE is the same. Yet, if transmit power is different according to a UE, it may be necessary to modify the operation. For example, if low interference is discovered in a specific resource unit, it is difficult to determine whether the low interference corresponds to a signal transmitted by a different adjacent UE with low power or a signal transmitted by a UE away from the UE with high power.

In this case, the UE can perform an operation according to each of the embodiments based on a channel gain. Specifically, an operation of transmitting information on transmit power to a transmission signal of each UE can be additionally performed. A UE selecting a resource calculates a channel gain with each UE based on received interference power and transmit power and can perform the abovementioned operation based on the calculated channel gain. In this case, the channel gain can be determined based on a difference between transmit power of a transmission UE and interference power received by a reception UE from the transmission UE.

Information on transmit power of each UE can be included as a part of a D2D message. For example, the information can be transmitted via a scheduling assignment (SA) message among the D2D message. In this case, a UE can perform decoding and/or power sensing on SA to calculate a channel gain based on transmit power and received interference power obtained via the SA among the remaining resources except a resource transmitted by a different UE. As a different example, the UE can notify a transmit power value to be used for prescribed time using a partial field of a D2D message transmitted at specific timing.

Or, in order to reduce complexity of decoding each of individual UE signals, the information on transmit power of each UE can be interlocked with a sequence of a reference signal. For example, transmit power of a UE is divided into several sections and a different reference signal sequence can be interlocked with each of the sections. In this case, if a UE performs transmission using transmit power belonging to a corresponding section, the UE can use a reference signal sequence interlocked with the transmit power. As a result, if a different UE detects a reference signal only, the different UE is able to identify the transmit power of the UE. If this operation is applied, "high/low of interference level" mentioned earlier in the present invention can be replaced with "high/low of channel gain".

For example, referring back to FIG. 11, the aforementioned principle 1, i.e., whether or not clean units exist more than a prescribed level is determined in the step S1101. If exist, as shown in the step S1102, a signal is transmitted to one of the clean resources. If a condition of the principle 1 is not satisfied, it is necessary for a transmission UE to select one from among dirty units in the step S1103. In this case, it is able to select a resource unit having the greatest a channel gain according to the principle 3. Similarly, in this case, a situation that a plurality of UEs continuously select the same resource may occur. In order to reduce the problem, the transmission UE may consider the aforementioned additional condition.

Or, if a transmission UE is able to directly measure a channel gain with a different UE, the channel gain can be utilized for selecting a resource. For example, assume that a UE0 measures a channel gain of a signal transmitted by a UE1 at t1 timing and measures a channel gain of a signal transmitted by a UE2 at t2 timing. And, assume that the channel gain of the UE1 is higher than the channel gain of the UE2. When clean resource units exist in a different frequency at both the t1 and the t2, if the UE0 selects a clean resource unit at the t1 timing, it may have an effect of reducing interference to a different signal not detected by the UE0. Similarly, when clean resource units are not sufficient at the t1 and the t2 and it is necessary to select one from among dirty resources, it is preferable to select a resource existing at the t1 to solve the problem.

As an example of utilizing a channel gain for selecting a resource, referring back to FIG. 13, a UE calculates a channel gain according to a resource unit and may be then able to select a resource based on the channel gain and transmit power of the UE.

Referring back to FIG. 14, the UE calculates a channel gain according to a resource unit and can determine transmit power. The UE can configure a threshold of the channel gain based on the transmit power. And, the UE can select a resource by comparing the threshold with a channel gain from each UE.

Method of Performing Transmission Based on Position of UE

Meanwhile, it may consider a method of transmitting a signal based on a position of a UE as a method for transmitting and receiving a signal in consideration of an impact of inter-UE interference. For example, it may be able to select a resource based on location information of a UE. As a different example, it may be able to determine a sequence of a reference signal to be used by a UE based on location information of the UE. In the following, a method of determining a sequence of a reference signal based on a location of a UE is proposed.

A UE divides the entire space region into a plurality of sets. A UE belonging to a specific set may use a reference signal sequence interlocked with the set. In this case, as an example of dividing a space region, the space region can be divided using an upper limit and a lowest limit of latitude and longitude. In this case, geographically adjacent UEs use the same reference signal sequence and the use of a sequence different from a sequence of a UE belonging to an adjacent set is guaranteed. Hence, it is able to overcome relatively weak interference from a reference signal of the UE belonging to the adjacent set using the difference of the sequence. In particular, if stable channel estimation is feasible, a D2D message can be successfully received by overcoming interference via channel coding.

According to the abovementioned method, a UE and a different UE belonging to the same set use the same reference signal. Yet, if the UEs use the same resource, since mutual interference of a message itself is too strong irrespective of whether or not reference signals are separated, it is impossible to properly receive the message. Hence, side effects are limitative.

Figure 15:
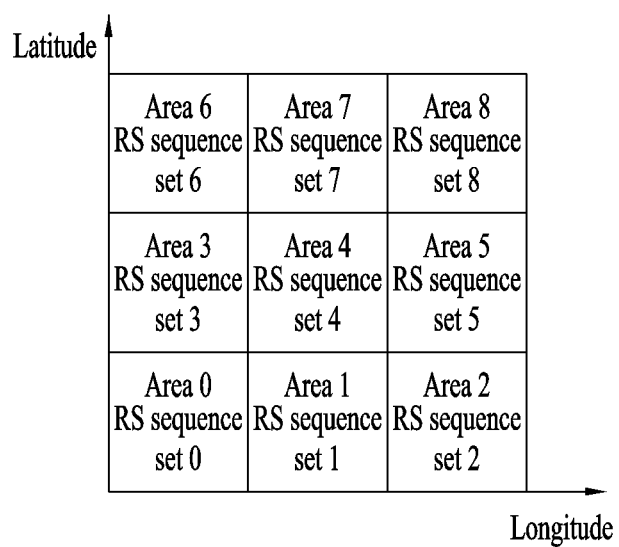
FIG. 15 is a diagram for explaining an example of determining a reference signal sequence according to a position of a UE in accordance with a different embodiment of the present invention.

FIG. 15 is a diagram for explaining an example of determining a reference signal sequence according to a position of a UE in accordance with a different embodiment of the present invention.

Referring to FIG. 15, there are 9 regions in total. In this case, each of the regions is interlocked with a reference signal sequence set. In this case, only a single sequence may appear in each reference signal sequence set. Yet, in order to avoid a reference signal collision in the same region, it may be able to configure a reference signal sequence set using a plurality of sequences. Specifically, a reference signal sequence set can be configured by various parameters for generating a reference signal sequence, e.g., a combination of a base sequence root index of LTE PUSCH, a cyclic shift value, and an orthogonal code cover value applied over a plurality of reference signal symbols. Of course, if the reference signal sequence is reused at a region placed at a certain distance, it may be able to set a limit on the total number of reference signal sequences. For example, in FIG. 15, a reference sequence set 1 used in a region 1 can be reused at a reference sequence set 8 used in a region 8.

Figure 16:
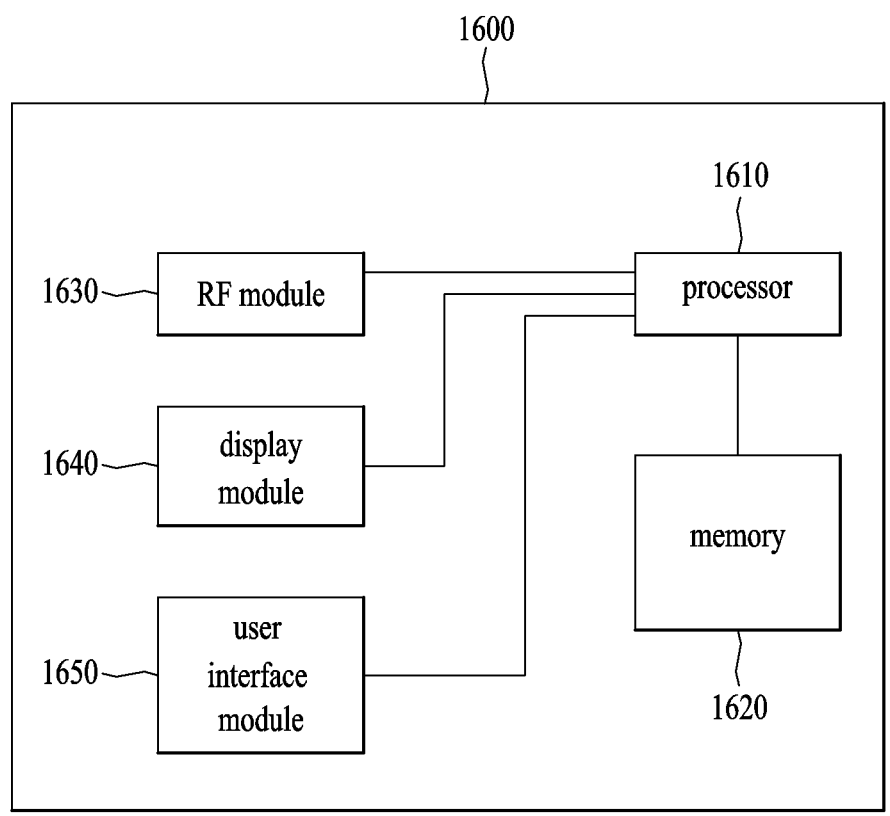
FIG. 16 is a block diagram for an example of a communication device according to one embodiment of the present invention.

FIG. 16 is a block diagram for an example of a communication device according to one embodiment of the present invention.

Referring to FIG. 16, a communication device 1300 may include a processor 1610, a memory 1620, an RF module 1630, a display module 1640, and a user interface module 1650.

Since the communication device 1600 is depicted for clarity of description, prescribed module(s) may be omitted in part. The communication device 1600 may further include necessary module(s). And, a prescribed module of the communication device 1600 may be divided into subdivided modules. A processor 1610 is configured to perform an operation according to the embodiments of the present invention illustrated with reference to drawings. In particular, the detailed operation of the processor 1310 may refer to the former contents described with reference to FIG. 1 to FIG. 15.

The memory 1320 is connected with the processor 1610 and stores an operating system, applications, program codes, data, and the like. The RF module 1630 is connected with the processor 1610 and then performs a function of converting a baseband signal to a radio signal or a function of converting a radio signal to a baseband signal. To this end, the RF module 1630 performs an analog conversion, amplification, a filtering, and a frequency up conversion, or performs processes inverse to the former processes. The display module 1640 is connected with the processor 1610 and displays various kinds of informations. And, the display module 1640 can be implemented using such a well-known component as an LCD (liquid crystal display), an LED (light emitting diode), an OLED (organic light emitting diode) display and the like, by which the present invention may be non-limited. The user interface module 1650 is connected with the processor 1610 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method of allocating a resource for device-to-device communication in a wireless communication system and an apparatus therefor are described centering on the example applied to 3GPP LTE system, the method and the apparatus can be applied not only to 3GPP LTE system but also to various wireless communication systems.

What is claimed is:

1. A method for transmitting a device-to-device (D2D) signal by a user equipment (UE) in a wireless communication system, the method comprising:
   configuring a threshold value for determining a set of resources, wherein the set of resources is used for transmitting the D2D signal;
   determining at least one candidate resource among a plurality of candidate resources as a candidate resource included in the set of resources based on the threshold value; and
   transmitting the D2D signal through the at least one candidate resource based on a number of candidate resources included in the set of resources being greater than or equal to a specific value,
   wherein the threshold value is related to a signal power of the plurality of candidate resources,
   wherein, based on the number of candidate resources included in the set of resources being less than the specific value, the threshold value is repeatedly increased until the number of candidate resources included in the set of resources is greater than or equal to the specific value, and
   wherein the candidate resource included in the set of resources is repeatedly determined based on the increased threshold value.

2. The method of claim 1, wherein, based on a signal power of a specific candidate resource being higher than the threshold value, the specific candidate resource is excluded in the set of resources.

3. The method of claim 1, wherein, based on a signal power of a specific candidate resource being equal to or lower than the threshold value, the specific candidate resource is determined as the candidate resource included in the set of resources.

4. The method of claim 1, wherein the plurality of candidate resources are included in a resource pool.

5. The method of claim 1, wherein the candidate resource included in the set of resources is located in a specific time interval, and
   wherein the specific time interval is determined such that a number of candidate resources included in the set of resources is greater than or equal to a predefined minimum number.

6. A user equipment (UE) for transmitting a device-to-device (D2D) signal in a wireless communication system, the UE comprising:
   a transceiver; and
   a processor configured to control the transceiver,
   wherein the processor further configured to:
   configure a threshold value for determining a set of resources, wherein the set of resources is used for transmitting the D2D signal,
   determine at least one candidate resource among a plurality of candidate resources as a candidate resource included in the set of resources based on the threshold value, and
   transmit the D2D signal through the at least one candidate resource, based on a number of candidate resources included in the set of resources being greater than or equal to a specific value,
   wherein the threshold value is related to a signal power of the plurality of candidate resources,
   wherein, based on the number of candidate resources included in the set of resources being less than the specific value, the threshold value is repeatedly increased until the number of candidate resources included in the set of resources is greater than or equal to the specific value, and wherein the candidate resource included in the set of resources is repeatedly determined based on the increased threshold value.

7. The UE of claim 6, wherein, based on a signal power of a specific candidate resource being higher than the threshold value, the specific candidate resource is excluded in the set of resources.

8. The UE of claim 6, wherein, based on a signal power of a specific candidate resource being equal to or lower than the threshold value, the specific candidate resource is determined as the candidate resource included in the set of resources.

9. The UE of claim 6, wherein the plurality of candidate resources are included in a resource pool.

10. The UE of claim 6, wherein the candidate resource included in the set of resources is located in a specific time interval, and wherein the specific time interval is determined such that a number of candidate resources included in the set of resources is greater than or equal to a predefined minimum number.

* * * * *